United States Patent
Pham et al.

(10) Patent No.: US 10,951,304 B2
(45) Date of Patent: Mar. 16, 2021

(54) SATELLITE COMMUNICATION FRAMEWORK AND CONTROL METHOD THEREOF

(71) Applicant: INTELLIGENT FUSION TECHNOLOGY, INC., Germantown, MD (US)

(72) Inventors: Khanh Pham, Kirtland AFB, NM (US); Dan Shen, Germantown, MD (US); Xin Tian, Germantown, MD (US); Genshe Chen, Germantown, MD (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 45 days.

(21) Appl. No.: 16/275,859

(22) Filed: Feb. 14, 2019

(65) Prior Publication Data
US 2020/0266883 A1 Aug. 20, 2020

(51) Int. Cl.
*H04B 7/185* (2006.01)
*H04L 12/813* (2013.01)
(Continued)

(52) U.S. Cl.
CPC ....... *H04B 7/18584* (2013.01); *H04L 41/147* (2013.01); *H04L 47/20* (2013.01); *H04L 47/627* (2013.01); *H04W 28/0236* (2013.01)

(58) Field of Classification Search
CPC .......... H04B 7/18584; H04W 28/0236; H04L 47/627; H04L 41/147; H04L 47/20
See application file for complete search history.

(56) References Cited

U.S. PATENT DOCUMENTS

| 2003/0031141 A1* | 2/2003 | Schweinhart | H04L 47/50 370/316 |
| 2010/0027424 A1* | 2/2010 | Radunovic | H04W 40/04 370/238 |

(Continued)

OTHER PUBLICATIONS

D. B. Choi and D. I. Choi, "Queueing system with queue length dependent service times and its application to cell discarding scheme in ATM networks," in IEE Proceedings—Communications, vol. 143, No. 1, pp. 5-11, Feb. 1996, doi: 10.1049/ip-com: 19960372. (Year: 1996).*

*Primary Examiner* — Thinh D Tran
(74) *Attorney, Agent, or Firm* — Anova Law Group, PLLC

(57) ABSTRACT

A satellite communication framework includes a satellite system controller; at least one satellite transponder; and a plurality of remote terminals, each including a modem, a router, and a terminal agent. The terminal agent is configured to, based on a current allowable data rate and measurements of a current router queue size and a current router packet arrival rate, use a delayed uplink resource assignment for each modem and an MCV-based flow-control policy to forecast a future router queue size and a future router packet arrival rate and further update the delayed uplink resource request for a time after an uplink allocation delay. The modem is configured to communicate with the router and also with the satellite system controller through the satellite transponder, perform modulation and demodulation, and manage packet loss and delay according to the future router queue size and the future router packet arrival rate.

11 Claims, 6 Drawing Sheets

(51) Int. Cl.
  *H04L 12/24* (2006.01)
  *H04L 12/863* (2013.01)
  *H04W 28/02* (2009.01)

(56) References Cited

U.S. PATENT DOCUMENTS

2019/0129771 A1\* 5/2019 Chen .................. G06F 12/0875
2019/0281466 A1\* 9/2019 Zhang ..................... H04L 41/12

\* cited by examiner

SATELLITE COMMUNICATION FRAMEWORK AND CONTROL METHOD THEREOF

FIELD OF THE DISCLOSURE

The present disclosure generally relates to the field of satellite communication technology and, more particularly, relates to a SATCOM framework and control method thereof.

BACKGROUND

Learning can be considered as a bridge between experience and knowledge. Concerning satellite communication (SATCOM) engineering, the term of knowledge includes a hub-spoke satellite communication architecture with a satellite ground hub, connected through a satellite transponder to remote SATCOM terminals together with bi-directional Internet-Protocol (IP) connections with a round trip propagation delay of 500 milliseconds, traffic demand types, and control messages. Experience derives from recurring terminal assignments, previous uplink terminal reports and downlink mode change requests, and traffic demand variations. Learning-based techniques are showing great success in application areas, e.g., speech recognition, natural language processing, image recognition, etc. But their applications on SATCOM to aid in reviewing terminal flexibility requesting waivers or exempts from existing SATCOM regulations have not been well explored.

The currently challenging requirements on provisioning a terminal just enough resources (e.g., non-overlapping time and frequency slots together with supportable communication modes) when needed and freeing up excess resources to accommodate others are a complex undertaking. They are constrained by tight integrations of remote terminals and the satellite ground hub, interactions among terminal routers and modems, variable data transfer requirements, messaging overheads, etc. Dynamic resource allocation attempts to predict the overall difficulty and likely decision outcome for each uplink resource assignment, thereby helping SATCOM resource pool managers or operators to triage incoming requests.

Simply adding more automation on dynamic resource allocation to the satellite ground hub and terminal modems results in new challenges. More automation will not solve those challenges arising with queue backlogs in terminal routers or traffic demand increases at terminal routers. The available literature regarding dynamic resource allocation driven by demands in the presence of flow control is not so wide. As alluded to before, the iterative learning nature of exploiting repetitive information deriving from iterations can be applied to remote terminals and satellite ground hubs. Remote terminals are often equipped with repetitive router and modem units, and iterative learning control can be adapted to those routers that have repetitive interactions, in order to learn instantaneous modem data rates and perform quality of service and load balancing. Therefore, learning routers together with flow control mechanisms can be considered as intelligent terminal agents cooperating with simple one-way feedback messages from terminal modems to achieve robust uplink allocation performance.

The present disclosure describes a framework equipped with distributed terminal agents for providing decision support to SATCOM network operation centers by identifying and highlighting key decision features that relate to demand-driven dynamic resource allocation in the presence of flow control, which must be addressed for future regulatory approval of terminal flexibility. Rather than using a traditional paradigm for reporting router queue backlogs and traffic demands to modems, interest in rate-based flow control mechanism as proposed herein is clearly attested by the simplicity of one-way message feedback from modems to routers for their available data rates. Furthermore, a control-theoretical approach enabled by Minimal-Cost-Variance (MCV) control theory for robustly regulating source and service rates that should be used to allow routers full quality of service (QoS) control, is provided.

BRIEF SUMMARY OF THE DISCLOSURE

One aspect of the present disclosure provides a SATCOM framework for SATCOM terminal flexibility. The SATCOM framework includes a satellite system controller; at least one satellite transponder, communicating with the satellite system controller; and a plurality of remote terminals, each including a modem, a router, and a terminal agent. The terminal agent is configured to, based on a current allowable modem data rate and measurements of a current router queue size and a current router packet arrival rate, and a delayed uplink resource assignment for each terminal modem; in addition of a Kalman state estimate and MCV-based flow-control policy to adjust a future router queue size, a future router packet arrival rate and further update the delayed uplink resource request for each terminal modem for a time after an uplink allocation delay. The modem is configured to communicate with the router and also with the satellite system controller through the at least one satellite transponder, perform modulation and demodulation between digital data of the router and analog signals of the at least one satellite transponder, and manage packet loss and delay according to the future allowable modem data rate and the future router packet arrival rate enforced by the terminal agent.

Another aspect of the present disclosure provides a control method of a SATCOM framework that includes a satellite system controller; at least one satellite transponder; and a plurality of remote terminals, each including a modem, a router, and a terminal agent. The method includes for each remote terminal, controlling the terminal agent to, based on a current allowable modem data rate and measurements of a current router queue size and a current router packet arrival rate, use a delayed uplink resource assignment for each terminal modem and a Kalman state estimate and MCV-based flow-control policy to adjust a future router queue size, a future router packet arrival rate and update the delayed uplink resource assignment for each terminal modem for a time after an uplink allocation delay. The method also includes controlling the modem of the each remote terminal to manage packet loss and delay according to the future allowable modem data rate and the future router packet arrival rate controlled by the terminal agent.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

In the field of satellite communication (SATCOM) technology, some difficulties are reviewed in keeping SATCOM responsive as operational environments and requirements rapidly evolve, especially related to accessing advanced services and providing resilience against threats. Growing interest is currently being addressed to SATCOM terminal flexibility for operating across multiple Geostationary orbit (GSO) and Non-Geostationary orbit (NGSO) constellations, in multiple frequency bands and support different modems/routers.

The emphasis of the present disclosure is on the feasibility of using learning and control engineering to help SATCOM regulatory agencies more efficiently, consistently, and effectively analyze requests to autonomously operate flow control and dynamic resource allocation consistent with increasing demands for connectivity and bandwidth. Due to the repetitive nature of user experiences, application performances, and service level agreements, terminal assignments of center frequencies for transmission, signal bandwidths, communication modes, and time intervals for transmission could benefit from the data collected during previous downlink mode change requests and uplink terminal reports. Intelligent terminal agents and enforcement coordination between terminal routers and modems are proposed and discussed in the views of iterative learning and Minimal-Cost-Variance (MCV) control-theoretic frameworks.

Figure 1:
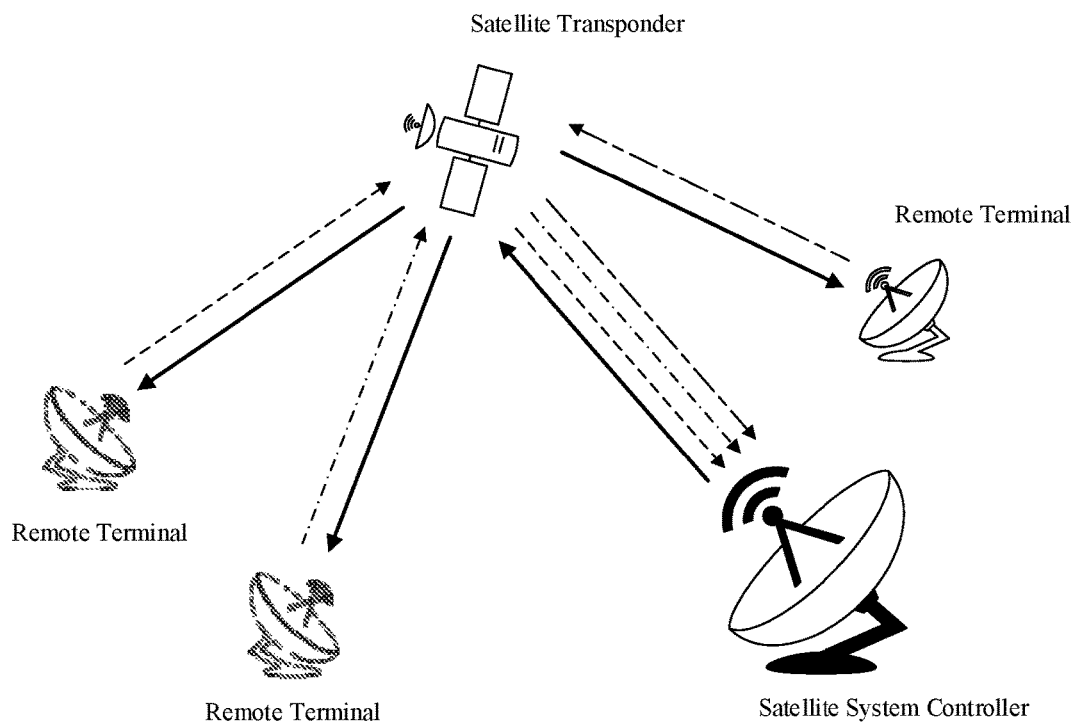
FIG. 1 illustrates a schematic diagram of a spoke-hub SATCOM architecture with a non-processing transponder.

FIG. 1 illustrates a schematic diagram of a spoke-hub SATCOM architecture with a non-processing transponder. Referring to FIG. 1, the SATCOM architecture illustrates uplink or return link resource request and allocation based on periodic-transmit messaging protocols. Per-epoch (i.e., a timescale including consecutive data frames) basis, the satellite system controller performs dynamic resource allocation (e.g., supportable communication modes, non-overlapping time and frequency slots) across all the terminal request information rates to ensure uplink resources being shared efficiently and fairly. With a periodic-transmit messaging protocol, it allows the satellite ground hub and remote terminals to not react to control message drops and not acknowledge control messages.

Figure 2:
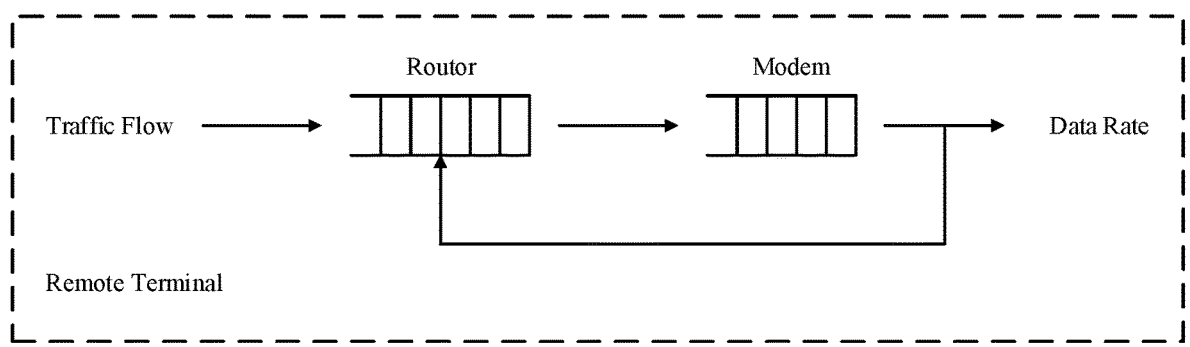
FIG. 2 illustrates a schematic diagram of a system model for remote terminals.

The SATCOM architecture shown in FIG. 1 includes a plurality of remote terminals. FIG. 2 illustrates a schematic diagram of a system model for remote terminals. Referring to FIG. 2, a remote terminal is usually equipped with repetitive router and modem units. According to the present disclosure, iterative learning control is adapted to those routers that have repetitive interactions to learn instantaneous modem data rates and perform quality of service and load balancing. Therefore, learning routers together with flow control mechanisms can be considered as distributed terminal agents cooperating with simple one-way feedback messages from terminal modems to achieve robust uplink allocation performance.

In one embodiment, a centralized algorithm, e.g., demand assigned multiple access (DAMA) procedure is run on the satellite system controller that is part of the satellite ground hub, which for every epoch, may receive a set of terminal report messages intermixed with data traffic, containing request information rates (RIRs) from N remote terminals. The aim from equipping the DAMA algorithm with RIRs is to provide remote terminals with committed information rates, $CIR_i$ with i=1, ..., N, that are on their service level agreements. To this end, actual $RIR_i(n)$ from remote terminals i at epoch n must be received.

In the event of terminal report losses, DAMA procedure may involve learning in order to use older terminal reports to extrapolate remote terminals' RIRs. Iterative learning alongside with the satellite system controller may generate a sequence of uplink resource allocation such that data transmission by terminal modems i with i=1, ..., N are as close as possible to meet $CIR_i$. The inner core of iterative learning may improve allowable data rates at remote terminals on the basis of previous operational data. While under contention, the satellite system controller may allow multi-access users to get their shares of the provisioned resources, e.g., forecasting future data rates for remote terminal i so as to maintain its own current data rates following any weighted averages (also known as learning rates) of differences between available and request information rates that are sent from other remote terminals through return link assignment request messages $$a_i(n+1) = a_i(n) + \frac{CIR_i}{\sum_{j=1}^{N} CIR_j}\left[CIR^{total} - \sum_{j=1}^{N} RIR_j(n)\right] \quad (1)$$

where $a_i(n+1)$ is the allowable data rates to be used by remote terminal i in D ∈ ℕ epochs in the future (also known as the uplink allocation delay or activation epoch), which refers to the number of epochs between when the assignment is made and when the assignment is used, e.g., n+D.

Figure 3:
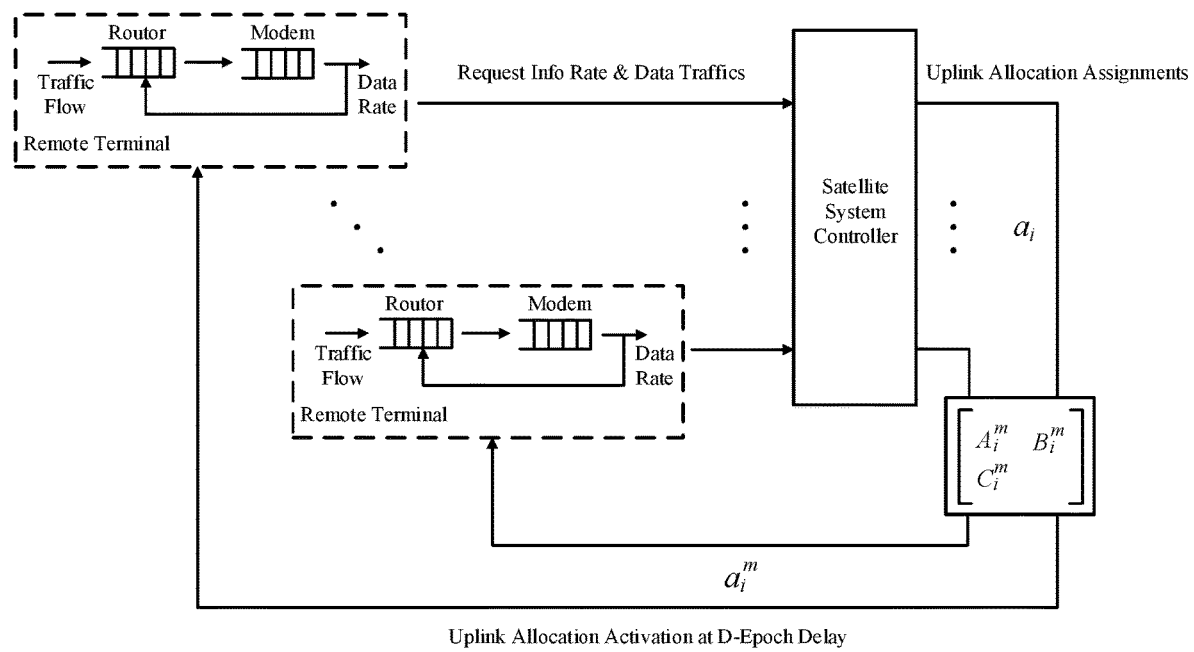
FIG. 3 illustrates a schematic diagram of a feedback structure of uplink resource allocation consistent with some embodiments of the present disclosure.

Due to satellite propagation and processing delays, remote terminals may use the uplink resource assignments starting at the specified times, e.g., activation epoch at n+D and for the specified durations. To capture the effect of uplink allocation delay, i.e., D units, the data rates allowable at remote terminals' modems for epoch n may be denoted as $$a^m(n) \triangleq \begin{bmatrix} a_1^M(n) \\ a_2^m(n) \\ \vdots \\ a_N^m(n) \end{bmatrix} = \begin{bmatrix} a_1(n-D) \\ a_2(n-D) \\ \vdots \\ a_N(n-D) \end{bmatrix} \quad (2)$$

where $a_i(n-D)$ are the delay components of D units for data rates allowable at remote terminals i with i=1, N. FIG. 3 illustrates the feedback structure between the satellite system controller and its remote terminals, in which the state space realization expressed in observability canonical form for allowable data rate, $a_i^m(n)$ at remote terminal i may be governed by $$x_i^m(n+1)=A_i^m x_i^m(n)+B_i^m a_i(n) \tag{3}$$

$$a_i^m(n)=C_i^m x_i^m(n), i=1,\ldots,N \tag{4}$$

where the superscript m associated with the modem subsystem at remote terminal i, which has D opportunities to receive its assignments repetitively transmitted from the satellite ground hub in epochs n, n+1, ... n+D−1. Moreover, the delayed uplink resource assignment for each terminal modem may be denoted by $x_i^m(n) \in \mathbb{R}^{D \times 1}$ and the system coefficients $A_i^m \in \mathbb{R}^{D \times D}$, $B_i^m \in \mathbb{R}^{D \times 1}$, and $C_i^m \in \mathbb{R}^{1 \times D}$ may be given by $$A_i^m = \begin{bmatrix} 0 & 0 & \ldots & 0 & 0 \\ 1 & 0 & \ldots & 0 & 0 \\ 0 & 1 & \ldots & 0 & 0 \\ \vdots & \vdots & \ddots & \vdots & \vdots \\ 0 & 0 & \ldots & 1 & 0 \end{bmatrix}; B_i^m = \begin{bmatrix} 1 \\ 0 \\ 0 \\ \vdots \\ 0 \end{bmatrix}; C_i^m = [0 \ 0 \ \ldots \ 0 \ 1].$$

As remote terminal capabilities grow more complex to address diverse operational requirements, e.g., across multiple satellites, frequency bands, etc., the modem is a key enabler of such a terminal flexibility. The modem may support multiple communications and networking waveforms. Basic functions of a modem are modulation and demodulation between digital data of a router and analog signals of radio reception, data rate request, and QoS management. As illustrated in FIG. 3, modem i with i=1, ..., N may be able to influence its assigned data rate via $RIR_i$ at epoch n to the satellite system controller, e.g., $$RIR_i(n)=\alpha_i^m d_i^m(n) \tag{5}$$

where the positive scalar, $\alpha_i^m \in \mathbb{R}_+$ denotes an amount proportional to predicted demand in steps of 25% $CIR_i$ up to 100% $CIR_i$ and $d_i^m(n)$ is the packet arrive rate or demand rate arriving from the router i.

From the view point of active queue management, modem i may regulate the queue length, $q_i^m$ in the modem buffer, $Q_i^m$ with a fluid-flow model $$q_i^m(n+1)=q_i^m(n)-\beta_i^m[s_i^m(n)-d_i^m(n)] \tag{6}$$

where different proportionality constants, $\beta_i^m \in \mathbb{R}_+$ can be used for discriminatory endowing of modem responsiveness to changing conditions and the effective packet service rate, $s_i^m(n)$ at epoch n by modem i is constrained by $$s_i^m(n)=\min\{q_i^m(n),a_i^m(n)\} \tag{7}$$

Figure 4:
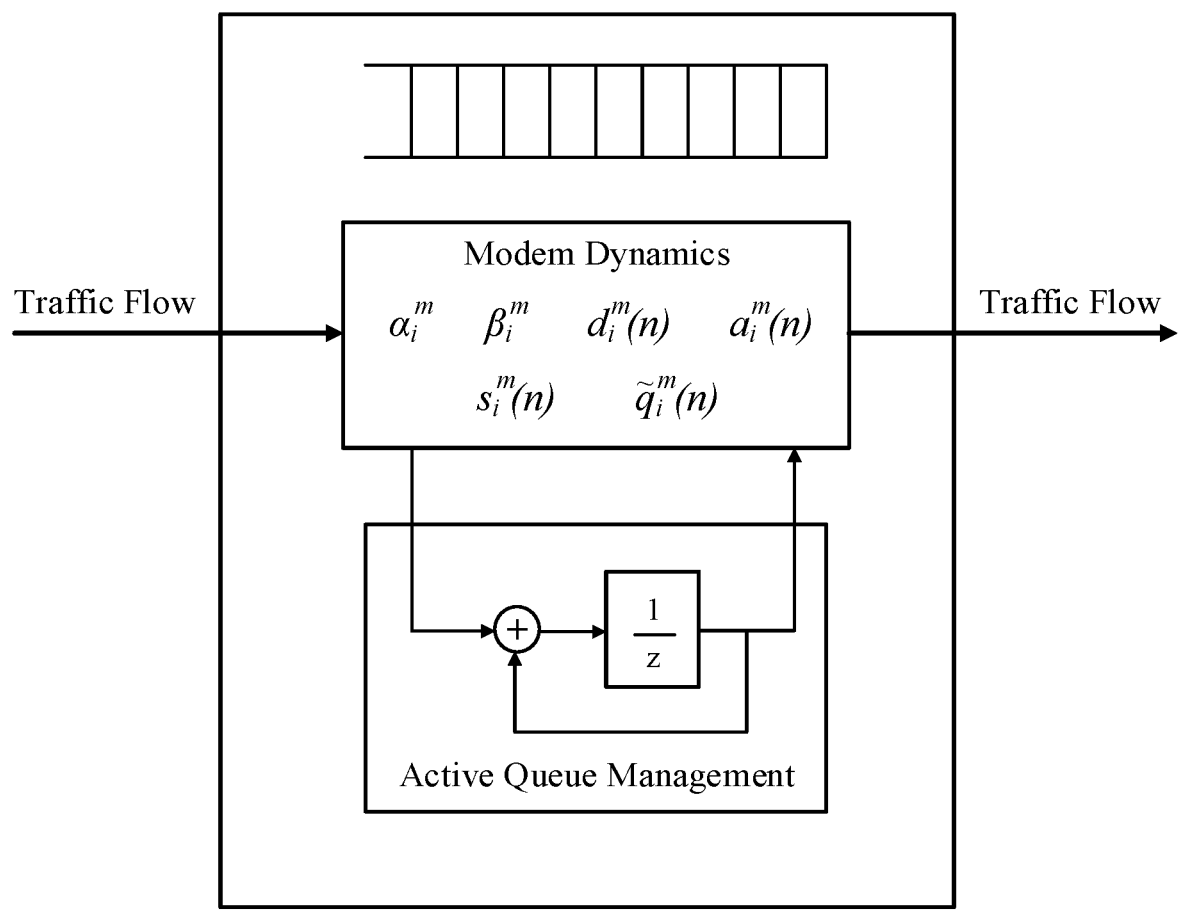
FIG. 4 illustrates a schematic diagram of active queue management in terminal modems consistent with various embodiments of the present disclosure.

Further, the shifted version of the variable $q_i^m$ may be defined as $\tilde{q}_i^m(n) \triangleq q_i^m(n) - Q_i^m$. FIG. 4 illustrates a schematic diagram of active queue management in terminal modems consistent with various embodiments of the present disclosure. Referring to till. 4, $$\frac{1}{z}$$

is a backward shift operator, which shifts the input signal one step back in time. Given $s_i^m(n)$ and $\beta_i^m$, the queue length of modem i may be regulated around the required buffer capacity, $Q_i^m$ according to the following dynamics $$\tilde{q}_i^m(n+1)=\tilde{q}_i^m(n)-\beta_i^m[s_i^m(n)-d_i^m(n)] \tag{8}$$

As expected, the interface between modem and router subsystems has become increasingly important. The present disclosure provides a different kind of modem management that exists for this interface and the rationale behind them. The emergence of control messages with less overhead burdens is identified as a trend that increases the importance of router and modem interface. In the following, all coordination between modems and routers will be discussed in detail. For example, in one embodiment, modem i may share its allowable transmit data rate information, $a_i^m(n)$ with router i.

Figure 5:
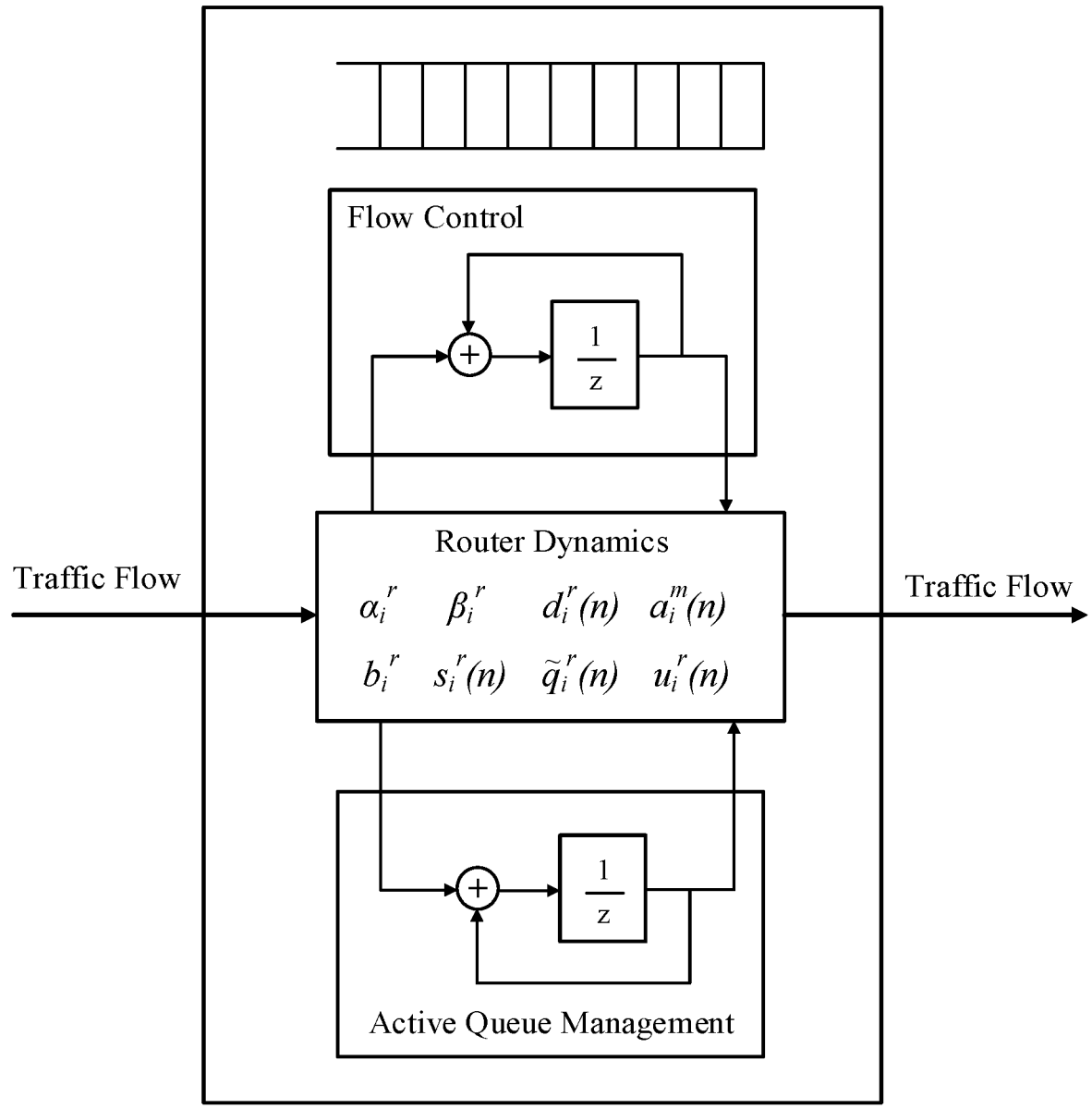
FIG. 5 illustrates a schematic diagram of rate-based flow control in terminal routers consistent with various embodiments of the present disclosure.

FIG. 5 illustrates a schematic diagram of rate-based flow control in terminal routers consistent with various embodiments of the present disclosure. Referring to FIG. 5, with regards to maintaining minimal queue in modem i, router i may be able to deliver an appropriate amount of packets to modem i in accordance with the available data rate, $a_i^m(n)$ allotted to modem i by the satellite system controller. In turn, modem i may not be aware of the queue backlog and traffic demand increase in router i. Therefore, a desirable situation is that router i is in control of its active queue management. For example, future queue behavior $q_i^r(n+1)$ of router i may not depend on the past, but only on the current queue size $q_i^r(n)$ and future inputs, e.g., at epoch n $$q_i^r(n+1)=q_i^r(n)-\beta_i^r[s_i^r(n)-d_i^r(n)] \tag{9}$$

where router i drives its effective service rate, $s_i^r(n)$ towards the packet arrival rate or demand rate, $d_i^r(n)$ by an amount proportional to the offset from $d_i^r(n)$ with a factor $\beta_i^r \in \mathbb{R}_+$.

The focus of the present disclosure is on defining a simple class of controlling the flow rate of the source and/or demand, $d_i^r(n)$ and allowing router i full active queue management. As background for investigating dynamic flow control mechanisms, it is required to affect the input rate $b_i^r u_i^r(n)$, where $u_i^r(n)$ is called the control and $b_i^r$ is some constant gain, e.g., $$d_i^r(n+1)=d_i^r(n)+b_i^r u_i^r(n)+w_i(n) \tag{10}$$

where $w_i(n)$ are the errors due to fluctuations in competing traffic and modeled by zero-mean additive white Gaussian random sequences with $E\{w_i(n)w_i(n)\}=W_i$.

Furthermore, according to (9), router i may update its effective packet service rate with $s_i^r(n)$ governed by $$s_i^r(n)=\min\{q_i^r(n),a_i^m(n)\} \tag{11}$$

On a related note, different types of traffic may need to be placed in separate queues and thus, allowing flow controllers to accurately manage source rates for specific queues. Regulation of the queue size as described in (9) around some desired level, $Q_i^r$ is a step toward eventually understanding potential minimization of losses and maximization of throughput. In particular, the evolution of router buffer size, under the shifted version of $q_i^r(n)$, e.g., $\tilde{q}_i^r(n) \triangleq q_i^r(n) - Q_i^r$, may therefore be governed by $$\tilde{q}_i^r(n+1)=\tilde{q}_i^r(n)-\beta_i^r[s_i^r(n)-d_i^r(n)] \tag{12}$$

which is part of active queue management and data rate-based tracking capabilities to achieve performance agility as depicted in FIG. 5.

Mainly due to anticipated terminal flexibility, various aspects of terminal provisioning, configuration, management, etc. are parts of the discussion of flexible terminal feasibility by developing conceptual frameworks. To help decision makers in their advocacy and review process for remote terminal autonomy, in one embodiment, it is recommended to connect modem i and router i. When the available transmit data rate is low, packets may build up in the queues of modem and router i. In this case, both packet service rates at the terminal modem and router as described in (7) and (11) may become $$s_i^r(n)=s_i^m(n)=a_i^m(n) \quad (13)$$

With the implementation of (13), only a subset of the interfaces for the terminal control and management functions may be necessary, as follows:

$$\tilde{q}_i^r(n+1)=\tilde{q}_i^r(n)-\beta_i^r[a_i^r(n)-d_i^r(n)] \quad (14)$$

$$d_i^r(n+1)=d_i^r(n)+b_i^r u_i^r(n)\pm w_i(n) \quad (15)$$

$$x_i^m(n+1)=A_i^m x_i^m(n)+\beta_i^m a_i(n) \quad (16)$$

$$a_i^m(n)=C_i^m x_i^m(n) \quad (17)$$

By highlighting the interfaces and their decisional factors as described in (14)-(17), potential standardization of these interfaces may become the principal focus, which may increase efficiency, reduce the cognitive workload on the satellite operator, and improve decision making towards multiple domain interoperability.

Motivated by wideband SATCOM in which flexible terminals are deployed to support global distribution and mobility, a real-time control problem for distributed terminal controllers is necessary. A distributed terminal controller is considered as an intelligent terminal agent, which is local to its terminal router that operates autonomously under the policy guidance; i.e., uplink resource allocation assignment from its terminal modem counterpart. The strength of distributed terminal agents in controlling globally dispersed remote terminals is their ability to react in real time to local events based on local situational awareness, e.g., a state-space representation of (14)-(17) as depicted herein for remote terminal i for i=1, . . . , N $$x_i(n+1)=A_i x_i(n)+B_i u_i(n)+G_i w_i(n) \quad (18)$$

where the state vector variables $x_i(n) \in \mathbb{N}^{D+3}$ (including router queue sizes in packets, packet arrival rates, uplink resource allocation assignments delayed at terminal modems, uplink resource assignments by the satellite system controller, and resource entitlements distributed by the satellite system controller) are defined by $$x_i(n) = \begin{bmatrix} x_{i,1}(n) \\ x_{i,2}(n) \\ x_{i,3}(n) \\ x_{i,4}(n) \end{bmatrix} \triangleq \begin{bmatrix} \tilde{q}_i^r(n) \\ d_i^r(n) \\ x_i^m(n) \\ a_i(n) \end{bmatrix}$$

the local transmission jitters managing routers' packet arrival rates by sources via rate-based flow control policies $u_i(n) \triangleq u_i^r(n) \in \mathbb{R}$ and the constant matrix system coefficients are given by $$A_i \triangleq \begin{bmatrix} 1 & \beta_i^r & -\beta_i^r C_i^m & 0 \\ 0 & 1 & 0_{1 \times D} & 0 \\ 0_{D \times 1} & 0_{D \times 1} & A_i^m & B_i^m \\ 0 & 0 & 0_{1 \times D} & 1 \end{bmatrix}; B_i \triangleq \begin{bmatrix} 1 \\ b_i^r \\ 0_{D \times 1} \\ 0 \end{bmatrix}; G_i \triangleq \begin{bmatrix} 0 \\ 1 \\ 0_{D \times 1} \\ 0 \end{bmatrix}.$$

At the end of epoch n, the router i obtains noisy estimates of its queue size of $\tilde{q}_i^r(n)$ and packet arrival rate of $d_i^r(n)$. For analytic purposes, $y_i(n)$ is adopted to denote the measurements for router queue sizes and packet arrival rates, e.g., $$y_i(n)=H_i x_i(n)+D_i v_i(n) i=1, \ldots, N \quad (19)$$

where the coupling matrix of measurement noises, $D_i \in \mathbb{R}^{2 \times 2}$ equals the identity matrix and the observation matrix $H_i \in \mathbb{R}^{2 \times (D+3)}$ is given by $$H_i = \begin{bmatrix} 1 & 0 & 0_{1 \times D} & 0 \\ 0 & 0 & 0_{1 \times D} & 0 \end{bmatrix}$$

and the measurement noise $v_i(n) \in \mathbb{R}^2$ is taken as an independent identically distributed Gaussian random vector sequence with zero mean and variance of $E\{v_i(n)v_i^T(n)\}=V_i$. Consequently, it may then indicate that the measurements (19) are unbiased.

Figure 6:
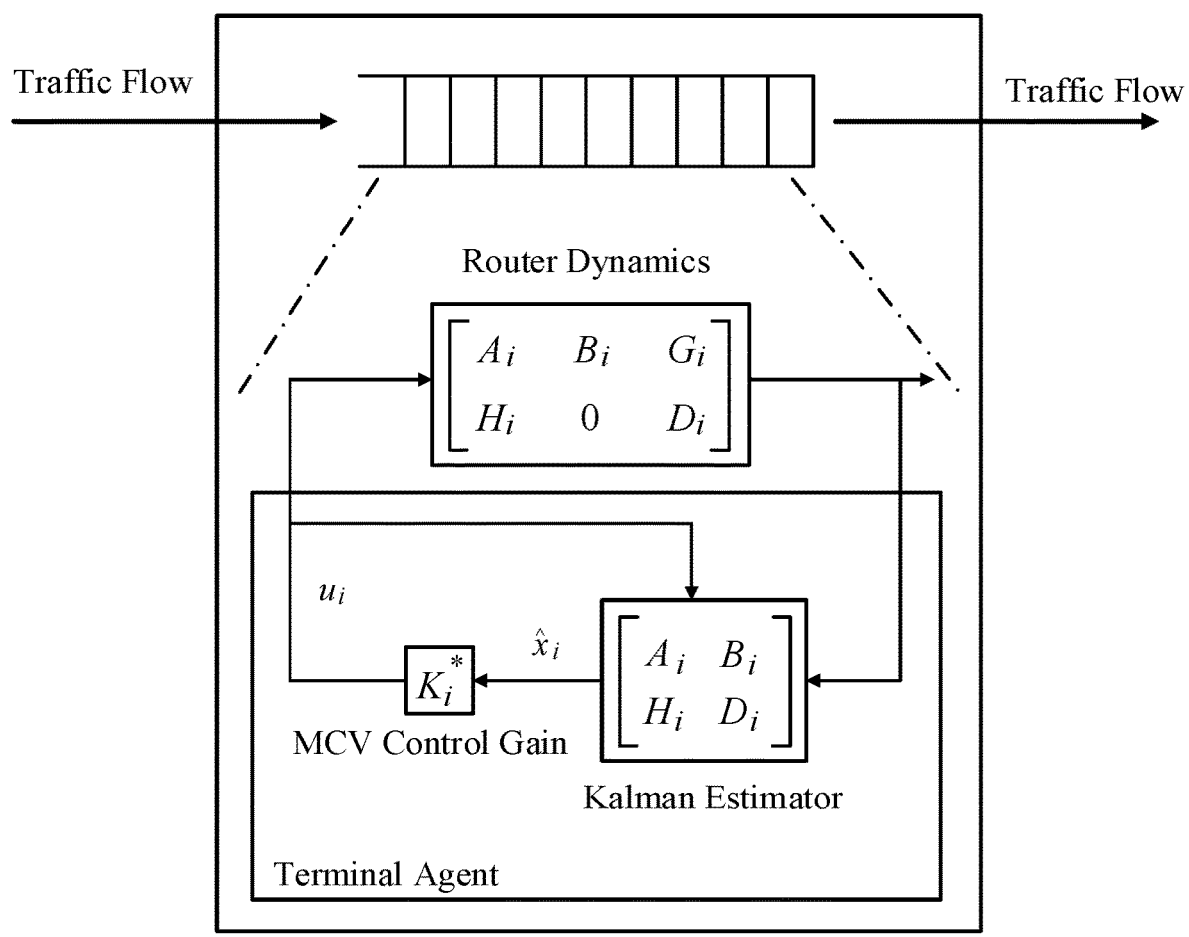
FIG. 6 illustrates a schematic diagram of an exemplary distributed terminal agent as a cascade of Minimal-Cost-Variance controller and a Kalman state estimator consistent with various embodiments of the present disclosure.

FIG. 6 illustrates a schematic diagram of an exemplary distributed terminal agent as a cascade of an MCV-based flow controller and a Kalman state estimator consistent with various embodiments of the present disclosure. Referring to FIG. 6, given the noisy measurements on router queue sizes and router packet arrival rates, the technical solution to the control of the rate of flow of packets into terminal router i in the presence of state estimation must adopt a very useful result known as the separation principle that allows the optimal control and the estimation problems to be solved independently. For example, from the data available at any discrete-time interval n (not necessarily be at epochs), e.g., $y_i(n_0), y_i(n_0+1), \ldots, y_i(j)$ with n>j, there is an urgent need to compute the best prediction of the state of the controlled router i, meaning $x_i(n)$ along with the best correction for both process and measurement noises. In this regard, the desirable prediction for one step ahead may be defined by the fundamental theorem of estimation $$\hat{x}_i(n|n-1)=E\{x_i(n)|y_i(n_0+1), \ldots, y_i(n-1)\} \quad (20)$$

where $E\{\cdot|\cdot\}$ represents for the conditional expectation operator of the enclosed entities.

Further, the single-stage predicted estimate, $\hat{x}_i(n|n-1)$ can be deduced $$\hat{x}_i(n|n-1)=A_i \hat{x}_i(n-1|n-1)+B_i u_i(n-1) \quad (21)$$

In one embodiment, two more parts for $y_i(n)$ must be carried on in a way that is similar to those for $x_i(n)$, e.g., the single-stage prediction estimate, $\hat{y}_i(n|n-1)$ and the prediction error, $\tilde{y}_i(n|n-1)$ $$\hat{y}_i(n|n-1)=E\{y_i(n)|y_i(n_0+1), \ldots, y_i(n-1)\} \quad (22)$$

$$\tilde{y}_i(n|n-1)=y_i(n)-\hat{y}_i(n|n-1) \quad (23)$$

In one embodiment, the filtered state estimate, $\hat{x}_i(n|n)$ and the predicted state estimate, $\hat{x}_i(n|n-1)$ are indeed very tightly coupled with each other $$\hat{x}_i(n|n)=\hat{x}_i(n|n-1)+E\{x_i(n)|\tilde{y}_i(n|n-1)\}-E\{x_i(n)\} \quad (24)$$

Moreover, the filter gain, $L_i(n)$ available at the terminal agent i may be defined by $$L_i(n)=E\{x_i(n)\tilde{y}_i^T(n|n-1)\}(E\{\tilde{y}_i(n|n-1)\tilde{y}_i^T(n|n-1)\})^{-1} \quad (25)$$

Therefore, it is shown that $$E\{x_i(n)|\tilde{y}_i(n|n-1)\}=E\{x_i(n)\}+L_i(n)\tilde{y}_i(n|n-1) \quad (26)$$

and thus, the derivation of the Kalman filter may be given by $$\hat{x}_i(n|n) = A_i\hat{x}_i(n-1|n-1) + B_iu_i(n-1) + L_i(n)[y_i(n) - H_i(A_i\hat{x}_i(n-1|n-1) + B_iu_i(n-1))] \quad (27)$$

Basically, $\hat{x}_i(n|n)$ available at the terminal agent i can now be determined recursively, but to the extent that the filter gain, $L_i(n)$ is needed to be found. In this respect, it is shown that $$E\{x_i(n)|\tilde{y}_i(n|n-1)\} = P_i(n|n-1)H_i^T \quad (28)$$

and $$E\{\tilde{y}_i(n|n-1)\} = H_iP_i(n|n-1)H_i^T + V_i + \quad (29)$$

Finally, it is clear that the predicted estimate error covariance, $P_i(n|n-1)$ should be computed, particularly when this calculation of $P_i(n|n-1)$ is recursive, dependent on the filtered estimate error covariance, $P_i(n-1|n-1)$, e.g., $$P_i(n-1|n-1) = L_i(n-1)V_iL_i^T(n-1) + [I - L_i(n-1)H_i]P_i(n-1|n-2)[I - L_i(n-1)H_i]^T \quad (30)$$

and $$P_i(n|n-1) = A_iP_i(n-1|n-1)A_i^T + G_iW_iG_i^T \quad (31)$$

In one embodiment, when the initial estimate error covariance $P_i(n_0|n_0) = P_{i,0}$ and the initial measurement $y_i(n_0) = H_ix_i(n_0) + D_iv_i(n_0)$ are given, then the initial filter estimate may be obtained as follows $$\hat{x}_i(n_0|n_0) = x_i(n_0) + P_{i,0}H_i^T[H_iP_{i,0}H_i^T + V_i(n_0)]^{-1}[y_i(n_0) + H_ix_i(n_0)] \quad (32)$$

Since measures of application performance, e.g., packet loss rate, video packet delay, and file transfer delay are what SATCOM users care about, terminal agents may focus on a variety of potential contributors to losses and delays, e.g., (i) tracking qualities of packet arrival rates in reference to available service rates, (ii) packet overflows at terminal queues due to prolonged insufficient data rates, and (iii) variability of router transmission rates. Key performance metrics to support the aforementioned terminal agent objectives (i)-(iii) may be included in the following definition of the performance index, $J_i(n_0)$ within an epoch and yet over a period of length M of fundamental units of transmission time (also known as interleaver blocks, e.g., $k=n_0, n_0+1, \ldots, M$ and starting from the interleaver block $n_0$)

$$J_i(n_0) = \Sigma_{k=n_0+1}^M \{\epsilon_{i,1}\|d_i^r(k) - C_i^m x_i^m(k)\|^2 + \epsilon_{i,2}\|\tilde{q}_i^r(k)\|^2 + \epsilon_{i,3}\|u_i(k)\|^2\} \quad (33)$$

where the first term represents the metric (i) with a high rate of tracking seemingly desirable; the second term is a penalty for deviating from the desirable queue capacity of $Q_i^r$: whose low and high values would respectively lead to wasteful throughput and loss potentials; the last term denotes a penalty for high jitter or burstiness of router transmission rate that may be undesirable on other traffics; and finally the positive weights $\epsilon_{i,1}, \epsilon_{i,2}, \epsilon_{i,3}$ are degrees of design freedom.

To complete the description of terminal agents, the performance index (33) is rewritten in terms of the new state variable $x_i(k)$ for the interleaver block k, e.g., $$J_i(n_0) = \Sigma_{k=n_0+1}^M \{x_i^T(k)Q_ix_i(k) + \epsilon_{i,3}\|u_i(k)\|^2\} \quad (34)$$

where the state weighting matrix $Q_i$ is defined by $$Q_i \triangleq \begin{bmatrix} \epsilon_{i,2} & 0 & 0_{1 \times D} & 0 \\ 0 & \epsilon_{i,1} & -\epsilon_{i,1}C_i^m & 0 \\ 0 & -\epsilon_{i,1}(C_i^m)^T & \epsilon_{i,1}(C_i^m)^TC_i^m & 0 \\ 0 & 0 & 0_{1 \times D} & 0 \end{bmatrix}$$

According to the disclosed SATCOM framework, the terminal agent in flexible SATCOM terminals encompasses an array of design principles and decision support mechanisms, and the operational configurations that can be dynamically controlled and managed through pre-existing knowledge, e.g., starting from interleaver block k $$x_i(k+1) = A_ix_i(k) + B_iu_i(k) + G_iw_i(k) \quad (35)$$

$$y_i(k) = H_ix_i(k) + D_iv_j(k) i = 1, \ldots, N \quad (36)$$

subject to the router performance evaluation for terminal utilization meeting CIRs and service level agreements with high probability as well as user application experience, e.g., $$J_i(n_0) = \Sigma_{k=n_0+1}^M \{x_i^T(k)Q_ix_i(k) + \epsilon_{i,3}\|u_i(k)\|^2\} \quad (37)$$

Moreover, seamlessly moving from one GSO/NGSO network to another requires tight coordination between terminal agents and mission management systems or network operation centers to the flexibility of handovers, while assuring high performance data transmit requirements. Therefore, robust communications between these entities are critical. In essence, the tax on the GSO/NGSO network capacity and efficient terminal operations may need to be minimized by reliably meeting CIRs and service level agreements with high probability on the first operation, rather than repeatedly sending uplink resource assignment requests and activations multiple times. Therefore, understanding the statistical distribution and variability of performance jitters as described in (37) is instrumental in enabling efficient terminal operations and helping terminal agents to select rate-based flow control policies, and it should be supported by the most natural framework of MCV control theory, in which the variance of the performance index (37) is minimized while its expected value is constrained a-priori.

In the following, the description should be viewed as an important signpost representing the theory of MCV control optimization. In particular, the emphasis on minimizing of the variance of $J_i(n_0)$ while its mean is forced to obey a constraint may have a bearing on the current setting, e.g., $$E\{J_i^2|Z_i(n_0)\} - E^2\{J_i(n_0)|Z_i(n_0)\} \quad (38)$$

may be minimized, while $$E\{J_i(n_0)|Z_i(n=_0)\} = h_i(n_0, Z_i(n_0)) \quad (39)$$

where $E\{\bullet|\bullet\}$ denotes the conditional expectation operator and the data $Z_i(n_0) \triangleq \{x_i(n_0)\}$.

The inevitable concern of $h_i(n_0, Z_i(n_0))$ may be with practical considerations, including terminal performance forecasts, planning functions, complexity of the terminal agent policies, etc. In one embodiment, given the general assessment, the choice of $h_i(n_0, Z_i(n_0))$ may not be entirely arbitrary. It must be selected such that it is always greater than the following quantity, e.g., $$\inf_{u_i(n_0),\ldots,u_i(M-1)} E\{J_i(n_0) \mid Z_i(n_0)\} \tag{40}$$

Accordingly, for the special class of linear-quadratic problem, the mean value constraint may be intuitively given by $$h_i(n_0, Z_i(n_0)) = m_i(n_0) + x_i^T(n_0)M_i(n_0)x_i(n_0) \tag{41}$$

where $m_i(n_0) \in \mathbb{R}^+$ and $M_i(n_0)$ is a symmetric and non-negative $(D+3) \times (D+3)$ real-valued matrix. Moreover, both $m_i(n_0)$ and $M_i(n_0)$ should be selected such that $$h_i(n_0, Z_i(n_0)) > \alpha_i(n_0, Z_i(n_0)) \tag{42}$$

where $\alpha_i(n_0, Z_i(n_0))$ is as given by (40).

FIG. 6 depicts the interconnection of the controlled router i, the rate-based flow control via MCV control optimization, and the Kalman state estimator. Further, the development of optimal variances of (37) may require a standard procedure for this type of consideration; first, the constraint equation may be appended to the expression to be minimized by means of a Lagrange multiplier, $\mu_i(n_0)$, and then the resulting equation may be imbedded into the more general class of problems where $n_0$ is a variable rather than a fixed initial time. Clearly, the solution of the more general problem may lead trivially to the solution of the problem posed herein. Consequently, it may be desired to find $\mu_i(k)$ and the router control policy for packet arrival rates be of the form $\gamma_i(k) \triangleq \gamma_i(k, Z_i(k))$, $n_0 \leq k \leq M-1$, such that $$E\{J_i^2(k)|Z_i(k)\} - E^2\{J_i(k)|Z_i(k)\} + 4\mu_i(k)[E\{J_i(k)|Z_i(k)\} - h_i(k, Z_i(k))] \tag{43}$$

is minimized, where $\mu_i(k) \in \mathbb{R}^+$ is a Lagrange multiplier, and where the four pre-multiplying $\mu_i(k)$ are introduced just for convenience. It should be noted that $Z_i(k)$ contains all the information available to terminal agent i's packet arrival rate adjustments at interleaver block k and the form chosen for $\gamma_i(k)$ together with a boundedness requirement contribute to the definition of the class of admissible controls.

Before proceeding with the development of the recursion equation however, let $\gamma_i^k \triangleq \{\gamma_i(k), \gamma_i(k+1), \ldots, \gamma_i(M-1)\}$, $k=n_0, \ldots M$, and let $$V\ C_i(k,Z_i(k)|\gamma_i^k) = E\{J_i^2(k)|Z_i(k)\} - E^2\{J_i(k)|Z_i(k)\} + 4\mu_i(k)[E\{J_i(k)|Z_i(k)\} - h_i(k,Z_i(k))] \tag{44}$$

where $VC_i$ signifies "variance cost."

In one embodiment, the assumption of linear flow control laws may lead naturally to desired quadratic costs, that is, for linear flow control laws, it is always possible to write, $$VC_i^*(k+1, Z_i(k+1)) = v_i^*(k+1) + x_i^T(k+1)V_i^*(k+1)x_i(k+1) \tag{45}$$

where $v_i^*(k+1) \in \mathbb{R}^+$ and $V_i^*(k+1)$ are symmetric and non-negative $(D+3) \times (D+3)$ real-valued matrices and whereas $n_0 \leq k \leq M-1$. Thus, for $\beta_i(k) \triangleq A_i x_i(k) + B_i \gamma_i(k)$, it may follow that $$E\{V\ C_i^*(k+1,Z_i(k+1))|Z_i(k)\} = v_i^*(k+1) + \beta_i^T(k)V_i^*(k+1)\beta_i(k) + Tr\{V_i^*(k+1)W_i\} \tag{46}$$

Aside from the relevance of $S_i(k) \triangleq Q_i + M_i(k+1)$ for $n_0 \leq k \leq M-1$, to the final-value conditions given by $m_i(M)=0$, $M_i(M)=0$, $v^*_i(M)=0$, and $V^*_i(M)=0$, some mathematical manipulations may further yield $$VC_i^*(k, Z_i(k)) = \min_{\gamma_i(k),\mu_i(k)} \{4\beta_i^T(k)S_i(k)W_iS_i(k) + E\{(w_i(k)S_i(k)w_i(k))^2\} - Tr\{S_i(k)W_i\} + \\ v_i^*(k+1) + \beta_i^T(k)V_i^*(k+1)\beta_i(k) + Tr\{V_i^*(k+1)W_i\} + \\ 4\mu_i(k)[m_i(k+1) + Y_i^T(k)\epsilon_{i,3}Y_i(k) + \beta_i^T(k)S_i(k)\beta_i(k) + \\ Tr\{S_i(k)W_i\} - m_i(k) - x_i^T(k)M_i(k)x_i(k)]\} \tag{47}$$

Performing the minimization with respect to $\gamma_i(k)$ for each terminal agent i with $i=1, \ldots, N$ at interleaver block k, the optimal MCV-based router flow controller $\gamma_i^*(k)$ for packet arrival rate adjustments at the controlled router i may be given by $$\gamma_i^*(k) = K_i^*(k)\hat{x}_i(k|k) \tag{48}$$

where the terminal agent i estimates the states $\hat{x}_i(k|k)$ of the controlled router i and feed back to configure the optimal MCV flow control policy, e.g., $$K_i^*(k) = -\frac{B_i^T \Lambda_i(k) A_i}{B_i^T \Lambda_i(k) B_i + \mu_i(k)\epsilon_{i,3}} \tag{49}$$

$$\Lambda_i(k) = S_i(k)W_iS_i(k) + \frac{1}{4}V_i^*(k+1) + \mu_i(k)S_i(k) \tag{50}$$

Using this MCV control gain (48) parameterized in the variance of (37) for packet arrival rate adjustments at the controlled router i and performing the minimization in terms of $\mu_i(k)$ the mean constraint may be obtained as follows $$M_i(k) = \epsilon_{i,3}(K^*_i)^T(k)K^*_i(k) + (A^*_i)^T(k)S_i(k)A^*_i(k) \tag{51}$$

$$m_i(k) = m_i(k+1) + Tr\{S_i(k)W_i\} \tag{52}$$

and the variance $$V^*_i(k) = (A^*_i)^T(k)[4S_i(k)W_iS_i(k) + V^*_i(k+1)]A^*_i(k) \tag{53}$$

$$v^*_i(k) = v^*_i(k+1) + Tr\{V^*_i(k+1)W_i\} + E\{(w_i(k)S_i(k)w_i(k))^2\} - Tr\{S_i(k)W_i\} \tag{54}$$

where $A^*_i(k) \triangleq A_i + B_i K^*_i(k)$ and $n_0 \leq k \leq M-1$.

Figure 7:
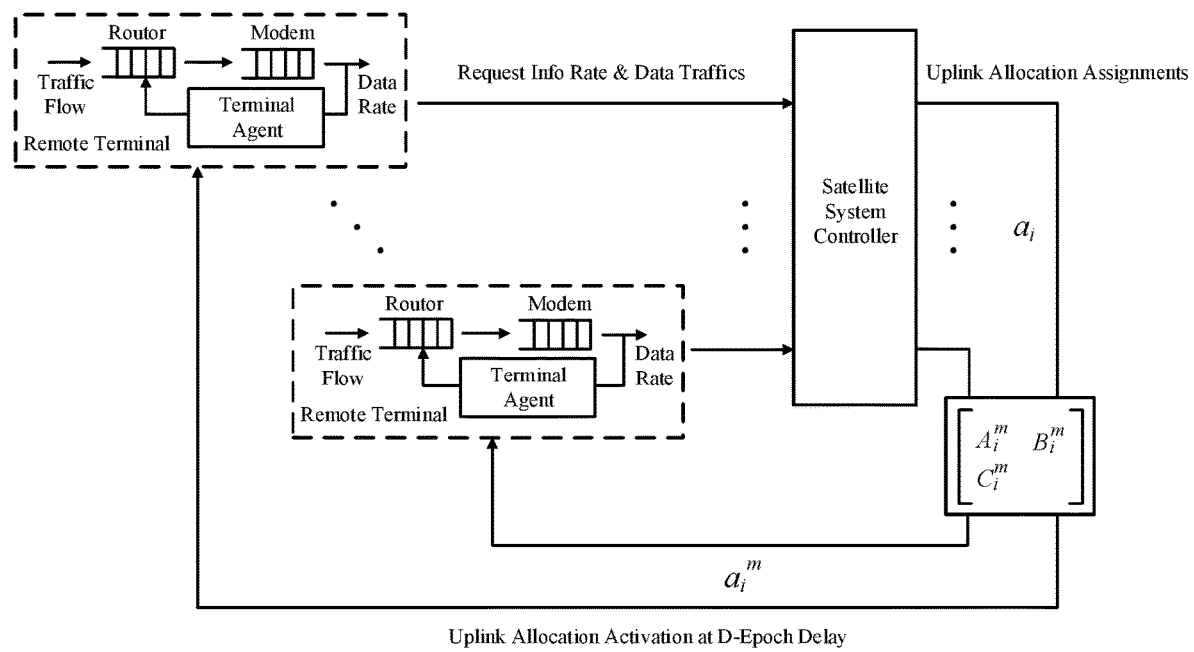
FIG. 7 illustrates a schematic diagram of an exemplary integrated framework for SATCOM terminal flexibility consistent with various embodiments of the present disclosure.

FIG. 7 illustrates a schematic diagram of an exemplary integrated framework for SATCOM terminal flexibility consistent with various embodiments of the present disclosure. Referring to FIG. 7, the use of terminal agents is to handle dynamic demand traffic in the presence of delayed uplink resource assignments. As expected, flow control with delayed allowable modem data rate information did require an increase in the dimension of the state space. The MCV control-theoretic framework according to the present disclosure offers an additional important advantage besides leading to a rate-based flow control design that is optimal with respect to various performance metrics. It further provides an analytical expression for optimal variances of performance index. This result is especially important in operational mindsets of performance risk aversion.

Moreover, effectiveness and versatility of the rate-based flow control paradigm developed here are promoting an open standard interface. It requires a simple one-way flow control message from terminal modems to its routers informing available data rates, without the routers having to inform the modem counterparts their traffic demands, and thus, avoiding interface complexity.

Also relevant is that terminal agents as anticipated here could better respond to traffic demand surges by offering SATCOM network resource efficiency while achieving resilient QoS router control and terminal performance reliability. Key capabilities to support these services are: 1) agile multi-objective terminal planning and configurations for transmission jitter mitigation, queue buffer overflow control, and source determining packet arrival rates according to available modem data rates; 2) effective modem and router interactions with less message control overheads; and 3) flow control with bounded performance jitter guarantees.

Compared to existing conceptual frameworks, the disclosed integrated framework provides robust, capable and flexible interoperability standards at interfaces among routers and modems. The present disclosure would not only enable flexible SATCOM terminals, but also allow SATCOM operators to more readily incorporate diverse, incompatible proprietary platforms and legacy terminals in wideband SATCOM enterprises.

The above detailed descriptions only illustrate certain exemplary embodiments of the present invention, and are not intended to limit the scope of the present invention. Those skilled in the art can understand the specification as whole and technical features in the various embodiments can be combined into other embodiments understandable to those persons of ordinary skill in the art. Any equivalent or modification thereof, without departing from the spirit and principle of the present invention, falls within the true scope of the present invention.

What is claimed is:

1. A satellite communication (SATCOM) framework, comprising:
    a satellite system controller;
    at least one satellite transponder, communicating with the satellite system controller; and
    a plurality of remote terminals, each including a modem, a router, and a terminal agent, wherein:
    the terminal agent is configured to, based on a current allowable data rate or resource entitlement for the remote terminal distributed by the satellite system controller and measurements of a current router queue size and a current router packet arrival rate, use a delayed uplink resource assignment for the modem together with a minimal-cost-variance (MCV)-based flow-control policy to adjust a future router queue size, a future router packet arrival rate and further update the delayed uplink resource request for the modem for a time after an uplink allocation delay, and
    the modem is configured to communicate with the satellite system controller through the at least one satellite transponder and also with the router, perform modulation and demodulation between digital data of the router and analog signals of the at least one satellite transponder, and manage packet loss and delay according to the future router queue size and the future router packet arrival rate forecasted by the terminal agent,
    the plurality of remote terminals includes N remote terminals, wherein:
    the uplink allocation delay lasts D epochs, wherein D is a positive integer and dependent on specific communication conditions and operational objectives;
    for an i-th (i=1, ..., N) remote terminal, a state vector variable $x_i(n) \in \mathbb{R}^{D+3}$ at epoch n is defined as $$\begin{bmatrix} \tilde{q}_i^r(n) \\ d_i^r(n) \\ x_i^m(n) \\ a_i(n) \end{bmatrix},$$

where $\tilde{q}_i^r(n)$ is the current router queue size, representing a difference between the current router queue size $q_i^r(n)$ and a desired router queue size $Q_i^r$, $d_i^r(n)$ is the current router packet arrival rate, $x_i^m(n) \in \mathbb{R}^D$ is the delayed uplink resource assignment for the modem, representing an uplink resource assignment for the modem delayed by D units of time, and $a_i(n)$ is the current allowable data rate or resource entitlement for the i-th remote terminal distributed by the satellite system controller; and
    the terminal agent of the i-th remote terminal is configured to control the future router queue size and the future router packet arrival rate of the i-th remote terminal at epoch (n+D) by determining a dynamical state vector variable $x_i(n+1)$ through $x_i(n+1) = A_i x_i(n) + B_i u_i(n) + G_i w_i(n)$, where constant coefficients $$A_i \triangleq \begin{bmatrix} 1 & \beta_i^r & -\beta_i^r C_i^m & 0 \\ 0 & 1 & 0_{1 \times D} & 0 \\ 0_{D \times 1} & 0_{D \times 1} & A_i^m & B_i^m \\ 0 & 0 & 0_{1 \times D} & 1 \end{bmatrix}; B_i \triangleq \begin{bmatrix} 1 \\ b_i^r \\ 0_{D \times 1} \\ 0 \end{bmatrix};$$

$$G_i \triangleq \begin{bmatrix} 0 \\ 1 \\ 0_{D \times 1} \\ 0 \end{bmatrix}, u_i(n)$$

is the MCV-based flow-control policy via MCV control-theoretic optimization for performance reliability of the i-th remote terminal; $w_i(n)$ is a measurement error due to fluctuations in competing traffic; $b_i^r$ is a constant gain, $\beta_i^r$ is a preset constant; and $$A_i^m = \begin{bmatrix} 0 & 0 & \cdots & 0 & 0 \\ 1 & 0 & \cdots & 0 & 0 \\ 0 & 1 & \cdots & 0 & 0 \\ \vdots & \vdots & \ddots & \vdots & \vdots \\ 0 & 0 & \cdots & 1 & 0 \end{bmatrix} \in \mathbb{R}^{D \times D}; B_i^m = \begin{bmatrix} 1 \\ 0 \\ 0 \\ \vdots \\ 0 \end{bmatrix} \in \mathbb{R}^{D \times 1};$$

$$C_i^m = [0 \ 0 \ \cdots \ 0 \ 1] \in \mathbb{R}^{1 \times D}.$$

2. The SATCOM framework according to claim 1, wherein:
    the terminal agent in each remote terminal includes a filtered state estimator, essentially configured to perform a prediction of a state of the controlled router for the current router queue size and the current router packet arrival rate.

3. The SATCOM framework according to claim 2, wherein the filtered state estimator includes:
    a Kalman state estimator, configured to provide estimates of the current router queue size and the current router packet arrival rate; and a rate-based flow controller, configured to modify a rate of flow of packet into terminal router with assistance of the Kalman state estimator according to minimal-cost-variance (MCV) control optimization.

4. The SATCOM framework according to claim 1, wherein:
$\beta_i^r$ is different for different remote terminals.

5. The SATCOM framework according to claim 1, wherein:
the measurements of $\tilde{q}_i^r(n)$ and $d_i^r(n)$ of the i-th remote terminal at an end of epoch n are denoted as $y_i(n) = H_i x_i(n) + D_i v_i(n)$, where $$H_i = \begin{bmatrix} 1 & 0 & 0_{1 \times D} & 0 \\ 0 & 0 & 0_{1 \times D} & 0 \end{bmatrix}, D_i \in \mathbb{R}^{2 \times 2}$$

is a coupling matrix of measurement noises, and $v_i(n) \in \mathbb{R}^2$ is a measurement noise vector; and
the terminal agent of the i-th remote terminal includes a Kalman state estimator and the MCV-based flow control policy, and is configured to minimize a variance of an index $J_i(n_0)$ within a transmission time from $n_0$ epoch to M epoch, wherein:
the index $J_i(n_0)$ is defined as $J_i(n_0) = \Sigma_{k=n_0+1}^{M} \{x_i^T(k) Q_i x_i(k) + \epsilon_{i,3} \|u_i(k)\|^2\}$, where $$k = n_0, n_0 + 1, \ldots, M, Q_i \triangleq \begin{bmatrix} \epsilon_{i,2} & 0 & 0_{1 \times D} & 0 \\ 0 & \epsilon_{i,1} & -\epsilon_{i,1} C_i^m & 0 \\ 0 & -\epsilon_{i,1}(C_i^m)^T & \epsilon_{i,1}(C_i^m)^T C_i^m & 0 \\ 0 & 0 & 0_{1 \times D} & 0 \end{bmatrix},$$

and $\epsilon_{i,1}$, $\epsilon_{i,2}$, $\epsilon_{i,3}$ are positive weights.

6. A control method of a SATCOM framework, wherein:
the SATCOM framework includes:
a satellite system controller;
at least one satellite transponder; and
a plurality of remote terminals, each including a modem, a router, and a terminal agent, and
the method for controlling the SATCOM framework includes:
for each remote terminal, controlling the terminal agent to, based on a current allowable data rate or resource entitlement for the remote terminal distributed by the satellite system controller and measurements of a current router queue size and a current router packet arrival rate, use a delayed uplink resource assignment for the modem and a minimal-cost-variance (MCV)-based flow-control policy to forecast a future router queue size and a future router packet arrival rate and further update the delayed uplink resource assignment for the modem for a time after an uplink allocation delay; and
controlling the modem of the each remote terminal to manage packet loss and delay according to the future router queue size and the future router packet arrival rate forecasted by the terminal agent, wherein
the uplink allocation delay lasts D epochs, wherein D is a positive integer and dependent on specific communication conditions and operational objectives;
the SATCOM framework includes N remote terminals;
for an i-th (i=1, ..., N) remote terminal, a state vector variable $x_i(n) \in \mathbb{R}^{D+3}$ at epoch n is defined as $$\begin{bmatrix} \tilde{q}_i^r(n) \\ d_i^r(n) \\ x_i^m(n) \\ a_i(n) \end{bmatrix},$$

where $\tilde{q}_i^r(n)$ is the current router queue size, representing a difference between the current router queue size $q_i^r(n)$ and a desired router queue size $Q_i^r$, $d_i^r(n)$ is the current router packet arrival rate, $x_i^m(n) \in \mathbb{R}^D$ is the delayed uplink resource assignment for the modem, representing an uplink resource assignment for the modem delayed by D units of time, and $a_i(n)$ is the current allowable data rate or resource entitlement for the i-th remote terminal distributed by the satellite system controller; and
controlling the terminal agent to use the delayed uplink resource assignment for the modem and the MCV-based flow-control policy to forecast the future router queue size and the future router packet arrival rate and further update the delayed uplink resource request for the modem includes determining a state vector variable $x_i(n+1)$ of the i-th remote terminal at epoch (n+D) through $x_i(n+1) = A_i x_i(n) + B_i u_i(n) + G_i w_i(n)$, where constant coefficients $$A_i \triangleq \begin{bmatrix} 1 & \beta_i^r & -\beta_i^r C_i^m & 0 \\ 0 & 1 & 0_{1 \times D} & 0 \\ 0_{D \times 1} & 0_{D \times 1} & A_i^m & B_i^m \\ 0 & 0 & 0_{1 \times D} & 1 \end{bmatrix}; B_i \triangleq \begin{bmatrix} 1 \\ b_i^r \\ 0_{D \times 1} \\ 0 \end{bmatrix};$$

$$G_i \triangleq \begin{bmatrix} 0 \\ 1 \\ 0_{D \times 1} \\ 0 \end{bmatrix}, u_i(n)$$

is the MCV-based flow-control policy via MCV control-theoretic optimization for performance reliability of the i-th remote terminal; $w_i(n)$ is a measurement error due to fluctuations in competing traffic; $b_i^r$ is a constant gain, $\beta_i^r$ is a preset constant; and $$A_i^m = \begin{bmatrix} 0 & 0 & \ldots & 0 & 0 \\ 1 & 0 & \ldots & 0 & 0 \\ 0 & 1 & \ldots & 0 & 0 \\ \vdots & \vdots & \ddots & \vdots & \vdots \\ 0 & 0 & \ldots & 1 & 0 \end{bmatrix} \in \mathbb{R}^{D \times D}; B_i^m = \begin{bmatrix} 1 \\ 0 \\ 0 \\ \vdots \\ 0 \end{bmatrix} \in \mathbb{R}^{D \times 1};$$

$$C_i^m = [0 \ 0 \ \ldots \ 0 \ 1] \in \mathbb{R}^{1 \times D}.$$

7. The control method according to claim 6, wherein:
the terminal agent of each remote terminal includes a filtered state estimator, and
controlling the terminal agent to use the delayed uplink resource assignment for the modem and the MCV-based flow-control policy to forecast the future router queue size and the future router packet arrival rate and further update the delayed uplink resource request for the modem includes using the filtered state estimator to perform a prediction of a state of the controlled router for the current router queue size and the current router packet arrival rate.

8. The control method according to claim 7, wherein:
the filtered state estimator includes a Kalman state estimator and a rate-based flow controller;
the Kalman state estimator is used to provide best estimates of the current router queue size and the current router packet arrival rate; and
the rate-based flow controller is used to modify a rate of flow of packet into terminal router with assistance of the Kalman state estimator according to MCV control optimization.

9. The control method according to claim 6, wherein:
$\beta_i^r$ is different for different remote terminals.

10. The control method according to claim 6, wherein:
the terminal agent of the i-th remote terminal includes a Kalman state estimator and the MCV-based flow-control policy;
the measurements of $\tilde{q}_i^r(n)$ and $d_i^r(n)$ of the i-th remote terminal at an end of epoch n are denoted as $y_i(n)=H_i x_i(n)+D_i v_i(n)$, where $$H_i = \begin{bmatrix} 1 & 0 & 0_{1 \times D} & 0 \\ 0 & 0 & 0_{1 \times D} & 0 \end{bmatrix}, D_i \in \mathbb{R}^{2 \times 2}$$

is a coupling matrix of measurement noises, and $v_i(n) \in \mathbb{R}^2$ is a measurement noise vector; and
the control method includes using the Kalman state estimator and the MCV-based flow-control policy to minimize a variance of an index $J_i(n_0)$ within a transmission time from $n_0$ epoch to M epoch, wherein:
the index $J_i(n_0)$ is defined as $J_i(n_0) = \Sigma_{k=n_0+1}^{M} \{x_i^T(k) Q_i x_i(k) + \epsilon_{i,3} \|u_i(k)\|^2\}$, where $$k = n_0, n_0+1, \ldots, M, Q_i \triangleq \begin{bmatrix} \epsilon_{i,2} & 0 & 0_{1 \times D} & 0 \\ 0 & \epsilon_{i,1} & -\epsilon_{i,1} C_i^m & 0 \\ 0 & -\epsilon_{i,1}(C_i^m)^T & \epsilon_{i,1}(C_i^m)^T C_i^m & 0 \\ 0 & 0 & 0_{1 \times D} & 0 \end{bmatrix},$$

and $\epsilon_{i,1}$, $\epsilon_{i,2}$, $\epsilon_{i,3}$ are positive weights.

11. The method according to claim 6, wherein:
the at least one satellite transponder communicates with the satellite system controller; and
in each remote terminal, the modem communicates with the at least one satellite transponder and the router, and performs modulation and demodulation between digital data of the router and analog signals of the at least one satellite transponder.

* * * * *